United States Patent
Abadi et al.

(10) Patent No.: US 7,908,265 B2
(45) Date of Patent: Mar. 15, 2011

(54) TRANSACTIONAL MEMORY WITH DYNAMIC SEPARATION

(75) Inventors: Martin Abadi, Palo Alto, CA (US);
Andrew D. Birrell, Los Altos, CA (US);
Timothy L. Harris, Cambridge (GB);
Michael A. Isard, San Francisco, CA (US); Johnson Hsieh, Waterloo (CA)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 12/033,715

(22) Filed: Feb. 19, 2008

(65) Prior Publication Data

US 2009/0210457 A1    Aug. 20, 2009

(51) Int. Cl.
*G06F 17/00* (2006.01)
(52) U.S. Cl. ........ 707/713; 707/722; 707/736; 707/758; 707/781; 707/791
(58) Field of Classification Search ........... 707/600–831
See application file for complete search history.

(56) References Cited

U.S. PATENT DOCUMENTS

| 7,206,903 | B1 | 4/2007 | Moir et al. | |
|---|---|---|---|---|
| 2004/0015514 | A1* | 1/2004 | Melton et al. | 707/103 R |
| 2004/0015642 | A1 | 1/2004 | Moir et al. | |
| 2007/0043933 | A1 | 2/2007 | Moir et al. | |
| 2007/0118579 | A1 | 5/2007 | Hudson | |
| 2007/0156780 | A1 | 7/2007 | Saha et al. | |
| 2007/0169031 | A1 | 7/2007 | Harris | |
| 2007/0186069 | A1 | 8/2007 | Moir | |
| 2007/0245128 | A1 | 10/2007 | Gray et al. | |
| 2007/0260608 | A1 | 11/2007 | Hertzberg et al. | |

OTHER PUBLICATIONS

Li; et al., "Certifying Concurrent Programs with Transactional Memory" pp. 1-10.
Abadi; et al., "Principles and Constructs for STM: Automatic Defense against the Living Dead" pp. 1-13.
Fraser; et al., "Concurrent Programming without Locks" ACM Journal Name, vol. V, No. N, M 20YY. pp. 1-59.
Isard; et al., "Automatic Mutual Exclusion" pp. 1-6.

* cited by examiner

*Primary Examiner* — Isaac M Woo (57) ABSTRACT

Strong semantics are provided to programs that are correctly synchronized in their use of transactions by using dynamic separation of objects that are accessed in transactions from those accessed outside transactions. At run-time, operations are performed to identify transitions between these protected and unprotected modes of access. Dynamic separation permits a range of hardware-based and software-based implementations which allow non-conflicting transactions to execute and commit in parallel. A run-time checking tool, analogous to a data-race detector, may be provided to test dynamic separation of transacted data and non-transacted data. Dynamic separation may be used in an asynchronous I/O library.

12 Claims, 8 Drawing Sheets

100 →

```
// Initially: x_shared=true, x=0,
//            x_shared protected, x protected // A1
x_shared = false;
// U1
unprotected {
    unprotect(&x);
    x ++;
}

// A2
if (x_shared) {
    x = 42;
}
```

110 →

```
// Initially: x_shared=false, x=0
//            x_shared protected, x unprotected // U1
unprotected {
    x = 42;
    protect(&x);
}
// A1
x_shared = true;

// A2
r1 = -1;
if (x_shared) {
    r1 = x;
}
```

TRANSACTIONAL MEMORY WITH DYNAMIC SEPARATION

BACKGROUND

It is common for multiple threads of a multi-threaded process to share common memory locations during concurrent execution. Consequently, two different threads of a multi-threaded process may read and update the same memory location accessible by the program. However, one thread should not modify a value of the shared memory location while the other thread is in the middle of a sequence of operations that depend on the value.

Software Transactional Memory (STM) is a concurrent programming mechanism in which memory operations are grouped into transactions. A transaction is a sequence of steps executed by a single thread. Transactions are atomic, i.e., each transaction either commits (it takes effect) or aborts (its effects are discarded). Transactions are linearizable or serializable, and appear to take effect in a one-at-a-time order. Transactions are intended to facilitate fine-grained synchronization such that there is no need to track locks that protect objects, and no need for elaborate deadlock-avoidance protocols.

Typical STM implementations allow threads to execute non-conflicting transactions in parallel, enabling data structures that scale with performance similar to that of complicated fine-grained locking, with the programming simplicity of coarse-grained locking. However, such implementations of transactional memory have typically provided unexpected semantics, required the re-compilation of non-transacted code, introduced high overheads, or assumed new hardware.

SUMMARY

A dynamic separation mechanism is provided whereby, at run-time, operations are performed to identify transitions between a transacted-access mode and a non-transacted-access mode for data items. An implementation provides strong semantics to programs that are correctly synchronized in their use of transactions and dynamic separation. Dynamic separation permits a range of hardware-based and software-based implementations, which allows non-conflicting transactions to execute and commit in parallel.

In an implementation, a method for dynamic separation in conjunction with a transaction may include opening an object for update, examining a protection bit to determine if the object is protected, and if the object is protected, allowing the transaction to proceed, and if the object is not protected, validating the transaction such that it rolls back if the access was attempted when invalid. Operations such as protect/unprotect may be provided to set data to a protected mode for access inside a transaction, and an unprotected mode for access outside a transaction. A run-time checking tool may be provided to test dynamic separation between transacted data and non-transacted data. Dynamic separation may be used in an asynchronous I/O library.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Implementations of dynamic separation are described where a runtime environment dynamically distinguishes between transacted data and non-transacted data. Data allocated inside a transaction is created in "protected" mode, and data allocated outside a transaction is created in "unprotected" mode. Dynamic separation provides explicit operations (e.g., protect/unprotect) to move data between these two modes. Further, dynamic separation implements a mechanism such that correctly synchronized programs that access data in the correct mode, i.e., protected data inside transactions, and unprotected data outside transactions, are executed with strong semantics, i.e. their transactions appear to run atomically with respect to all other operations.

A memory transaction is a sequence of memory operations that either execute completely (commit) or have no effect (abort). Ideally, a transaction defines an "all or nothing" sequence of operations where on commit, all memory operations appear to take effect as a unit (i.e., all at once). On abort, none of the series appears to take effect. Transactions run in isolation such that effects of stores are not visible until the transaction commits and no concurrent conflicting accesses are made by other transactions or made directly to memory. This ideal behavior is known as "Strong Atomicity" (also called "Strong Isolation").

Many (transactional memory) TM implementations do not provide this ideal behavior. Instead, they provide "Weak Atomicity" (also called "Weak Isolation") in which a transaction commits if there are no conflicting accesses by other transactions but conflicts with direct accesses to memory may go undetected. This behavior is attractive because it supports implementations in which no changes are needed to compile non-transactional code. This property makes transactions "pay-to-use" and lets non-transacted code rely on features not available for re-compilation (e.g., libraries, system calls, and hardware DMA transfers). In some implementations, a transaction's stores may become visible to direct accesses before it has committed. In some implementations, a transaction may commit even if another processor has directly updated a location read by the transaction. Hardware transactional memory (HTM) supports atomicity through architectural means, whereas software transactional memory (STM) supports atomicity through languages, compilers, and libraries. HTM typically provides strong atomicity. STM typically provides weak atomicity Various programming language features can be built over transactional memory providing mechanisms to delimit the scope of transactions. The Automatic Mutual Exclusion (AME) programming language features are based on a model where all shared state is implicitly protected unless the programmer explicitly specifies otherwise. An AME program is composed from serializable atomic fragments, and includes features to delimit and manage the fragments to achieve appropriate program structure and performance. The resulting programming model provides a straightforward mechanism to write correct code, i.e., code that is correctly synchronized and without data races. A programmer may then take this correctly synchronized program and optimize it by explicitly declaring the places where the optimizations occur.

AME supports mechanisms for accessing data transactionally and non-transactionally by distinguishing protected code, which executes within transactions, from unprotected code, which does not. The default is protected code, and unprotected code is supported primarily in order to permit interactions with legacy code. Running an AME program comprises executing a set of asynchronous method calls. The AME system provides for program execution that is equivalent to executing each of these calls (or their fragments, defined herein) in some serialized order.

An asynchronous call is created by the invocation:
async MethodName(<method arguments>);
The caller continues immediately after this invocation. In the serialization of the program, the asynchronous callee will be executed after the caller has completed. AME achieves concurrency by executing asynchronous method calls in transactions, overlapping the execution of multiple calls, with rollbacks when conflicts occur. If a transaction initiates other asynchronous method calls, their execution is deferred until the initiating transaction commits, and they are discarded if the initiating transaction aborts.

Implementations of programming language features built over TM may support a particular "programming model" that defines a discipline for using the language features correctly. If a program follows this discipline correctly then correct implementations of the programming language guarantee that it will execute as-if with strong atomicity, even if the implementation uses a TM that provides weak atomicity. Some programming models may be designed to enable the use of a range of different transactional memory implementations, such as software transactional memories that make in-place updates as transactions run, STMs that defer updates until a transaction commits, and STMs that use different representations for transacted and non-transacted objects. Some programming models may be designed to avoid changes to how non-transacted code is compiled. Some programming models may be designed to avoid extra run-time state being maintained to support the programming model, particularly when being implemented using HTM that offers strong atomicity. This property exposes performance benefits of an HTM implementation.

Examples of different disciplines for programming with transactions include (i) strong atomicity, (ii) violation-freedom and (iii) static separation. These may be viewed as different definitions of how programs are correctly synchronized. In the strong atomicity approach, all programs are considered to be correctly synchronized. This approach may lead to re-compilation for non-transacted code, to slower implementations, or to the need for hardware support. Moreover, simply using a TM that provides strong atomicity may not be sufficient for executing all programs with strong atomicity, as program transformations that may add, remove, or re-order accesses must be considered.

Violation-freedom is a programming discipline where programs are to be violation-free in the sense that, if executed with strong atomicity, they do not attempt to make conflicting accesses to the same location at the same time from transacted and non-transacted code. This condition is reminiscent of the existing rules for programming correctly with locks.

However, not all violation-free programs are correctly implemented by STMs. If the order in which transactions are serialized does not reflect the real-time order in which their commit operations finish, then code that runs after a transaction may not see updates made by transactions that were serialized before it. Furthermore, in systems that use in-place updates and optimistic concurrency control, transactions may continue to run as "zombies" before a conflict is detected. During this time, a zombie may make updates that are seen by non-transacted code. Furthermore, STMs that correctly implement this discipline may require synchronization between all transactions, not just those that access overlapping data to prevent non-conflicting transactions running and committing in parallel, harming scalability.

Static separation is a programming discipline of separation of transacted and non-transacted data. Several definitions of static separation have been considered, such as restricting transactions to accessing immutable data and designated "transactional variables," and restricting transactions from accessing other mutable data. Static separation may be used in functional languages where most state is expected to be immutable.

According to some implementations, dynamic separation may be used as a programming discipline that treats more programs as correctly synchronized than with static separation but fewer programs as correctly synchronized than violation-freedom. Dynamic separation is compatible with a wide range of TM implementations without introducing contention between non-conflicting transactions. Dynamic separation also allows data to be shared between protected and unprotected (transacted/un-transacted) code, without copying.

In some implementations, a programmer may determine where to place protect/unprotect alls. In some implementations, a system or programming tool may account for the above considerations and determine where to place the calls to protect and unprotect. For example, a compiler or run-time tool may determine where to place them.

Dynamic separation dynamically distinguishes between transacted data and non-transacted data. Data allocated inside a transaction is created in "protected" mode, and data allocated outside a transaction is created in "unprotected" mode. Dynamic separation provides explicit operations (e.g., protect/unprotect) to move data between these two modes. Further, dynamic separation implements a mechanism such that correctly synchronized programs access data in the correct mode, i.e., protected data inside transactions, and unprotected data outside transactions.

Figure 1:
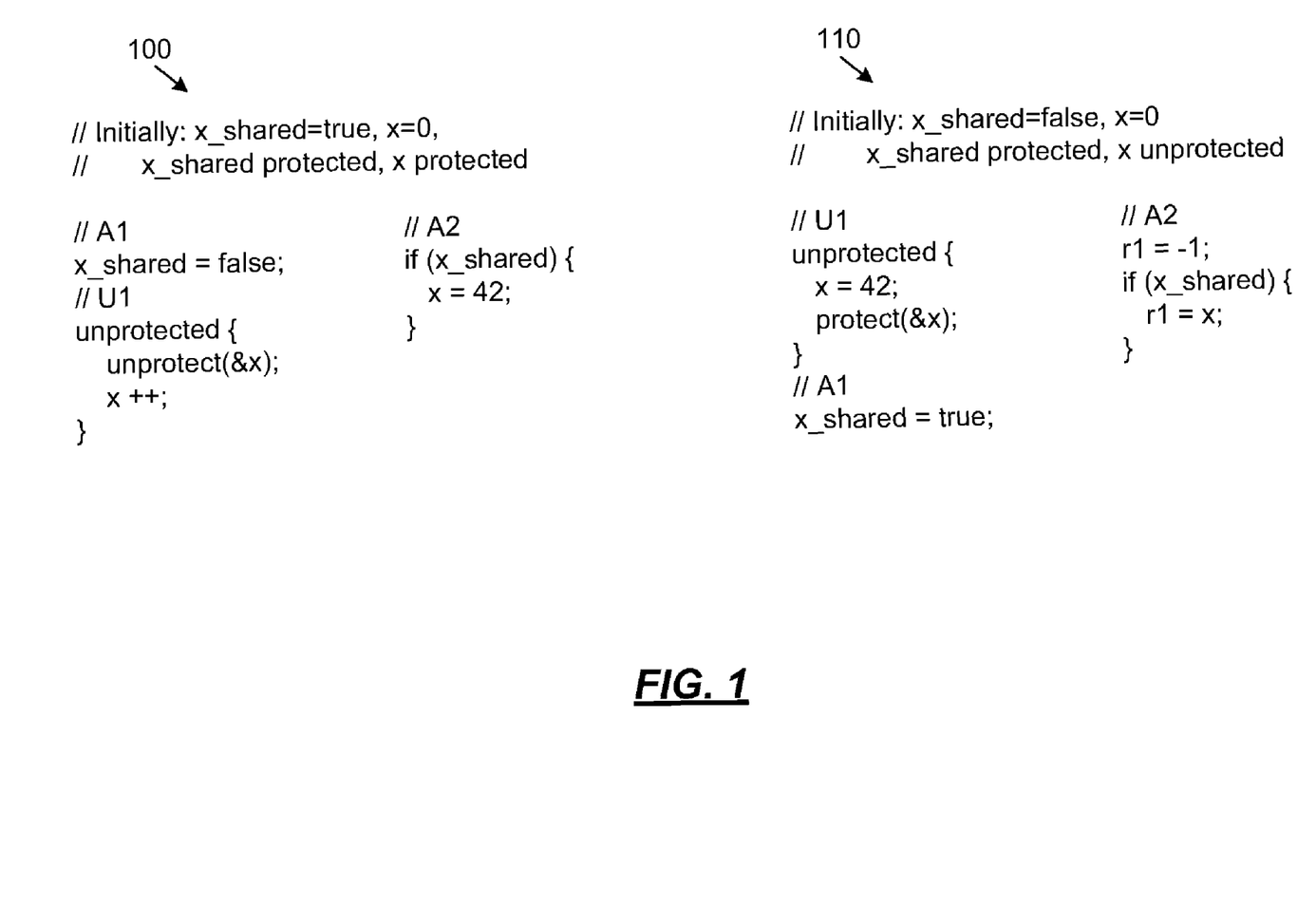
FIG. 1 is an example of dynamic separation.

Dynamic separation may restrict where data is actually accessed by a program rather than how the data is reachable through references. Non-transacted data may be passed between threads via a transactional collection class. This feature allows the expression of many idioms without calling protect/unprotect. However, as shown in FIG. 1, privatization and publication idioms may use explicit protect/unprotect calls because they involve the same data changing protection mode over time. Reference 100 illustrates the privatization idiom with dynamic separation where x is initially shared and then made private to U1. Reference 110 illustrates the publication idiom with dynamic separation, where x is published by U1 to A2.

A definition of dynamic separation using the AME calculus may be as follows. The AME calculus is a language that includes constructs for AME, higher-order functions, and imperative features. The syntax introduces syntactic categories of values, constants, variables, and expressions. The values are constants, variables, and lambda abstractions (λx. e). In addition to values and to expressions of the forms async e, blockuntil e, and unprotected e, the expressions include notations for function application (ef), allocation (ref e, which allocates a new reference location and returns it after initializing it to the value of e), dereferencing (!e, which returns the contents in the reference location that is the value of e), and assignment (e:=f, which sets the reference location that is the value of e to the value of f). The constructs associated with the implementations of dynamic separation are protect e (protect the reference location that is the value of e) and unprotect e (unprotect the reference location that is the value of e).

The strong semantics of the AME calculus is a small-step operational semantics in which at most one transaction may take steps at any one time, and non-transacted code may take steps only when there is no current transaction taking steps. Reference accesses are made to a sequentially consistent, single shared heap. In some implementations, strong semantics may be extended to constructs, such as a component that associates a protect mode P or unprotect mode U with each reference location. The reference-allocation construct ref e initializes the new location's mode to P (when allocating inside a transaction) or to U (otherwise). The new constructs protect/unprotect set the mode to P and to U respectively. The formal details are as follows.

A state $(\sigma, \tau, T, e)$ consists of a reference store $\sigma$, a protection state $\tau$, a collection of expressions T, and a distinguished active expression e. A reference store $\sigma$ is a finite mapping of reference locations to values. Similarly, a protection state $\tau$ is a finite mapping of reference locations to protection modes; it is a "history variable," in the sense that it is determined by the history of execution. Reference locations are variables that may be bound only by the respective store and protection state. RefLoc may be written for the set of reference locations. It may be assumed that RefLoc is infinite. Let:

$S \in State=RefStore \times ProtState \times ExpSeq \times Exp$ $\sigma \in RefStore=RefLoc \rightharpoonup Value$ $\tau \in ProtState=RefLoc \rightharpoonup \{P, U\}$ $r \in RefLoc \subset Var$ $T \in ExpSeq=Exp^*$ For every state $(\sigma, \tau, T, e)$, $dom(\sigma)=dom(\tau)$ and if $r \in RefLoc$ occurs free in $\sigma(r')$, in T, or in e, then $r \in dom(\sigma)$.

In some implementations, the following evaluation contexts may be used:

P=[ ]|P e|V P|ref P|!P|P:=e|r:=P|blockuntil P|protect P|unprotect P

U=unprotected ∈|U e|V U|ref U|!U|U:=e|r:=U|blockuntil U|protect U|unprotect U

ϵ=[ ]ϵ e|V ϵ|ref ϵ|!ϵ|ϵ:=e|r:=ϵ|blockuntil ϵ|unprotected ϵ|protect ϵ|unprotect ϵ

A context E is a general evaluation context; a context U is one where the hole is under unprotected; a context P is one where it is not.

In some implementations, rules that specify the transition relation that takes execution from one state to the next may be specified. These may be as follows:

$\langle \sigma,\tau,T,\epsilon[(\lambda x.e)V]\rangle \mapsto_s \langle \sigma,\tau, T,\epsilon[e[V/x]]\rangle$ $\langle \sigma,\tau, T,P[ref V]\rangle \mapsto_{ss} \langle \sigma[r \mapsto V], \tau[r \mapsto P],T,P[r]\rangle$ if $r \in$ Refloc-dom $(\sigma)$ $\langle \sigma,\tau,T,U[ref V]\rangle \mapsto_{ss} \langle \sigma[r \mapsto V], \tau[r \mapsto U],T,U[r]\rangle$ if $r \in$ Refloc-dom $(\sigma)$ $\langle \sigma,\tau,T,\epsilon[!r]\rangle \mapsto_{ss} \langle \sigma,\tau,T,\epsilon[V]\rangle$ if $\sigma(r)=V$ $\langle \sigma,\tau,T,\epsilon[r:=V]\rangle \mapsto_{ss} \langle \sigma[r \mapsto V],\tau,T,\epsilon[unit]\rangle$ $\langle \sigma,\tau,T,\epsilon[async\ e]\rangle \mapsto_s \langle \sigma,\tau,T,e,\epsilon[unit]\rangle$ $\langle \sigma,\tau,T,\epsilon[blockuntil\ true]\rangle \mapsto_s \langle \sigma,\tau,T,\epsilon[unit]\rangle$ $\langle \sigma,\tau,T,\epsilon[unprotected\ e]\rangle \mapsto_s \langle \sigma,\tau,T.\epsilon[unprotected\ e], unit\rangle$ $\langle \sigma,\tau,T,\epsilon[unprotected\ V]\rangle \mapsto_s \langle \sigma,\tau,T,\epsilon[V]\rangle$ $\langle \sigma,\tau,T.e.T', unit\rangle \mapsto_s \langle \Sigma,\tau,T.T',e\rangle$ $\langle \sigma,\tau,T,\epsilon[protect\ r]\rangle \mapsto_s \langle \sigma,\tau[r \mapsto_s P],T,\epsilon[r]\rangle$ $\langle \sigma,\tau,T,\epsilon[unprotect\ r]\rangle \mapsto_s \langle \sigma,\tau[r \mapsto U],T,\epsilon[r]\rangle$ A context is an expression with a hole [ ], and an evaluation context is a context of a particular kind. Given a context C and an expression e, then C[e] is written for the result of placing e in the hole in C. A context E is a general evaluation context; a context U is one where the hole is under unprotected; a context P is one where it is not.

In the AME calculus, for a program to be correctly synchronized under the dynamic-separation discipline, a state $(\sigma, \tau, T, e)$ is locally good when:

e is not of the form P[protect r] or P[unprotect r]; i.e., protect/unprotect are not used in protected contexts, if e is of the form P[!r] or P[r:=V], then $\tau(r)$=P; i.e., protected contexts access only protected data, and if e is of the form U[!r] or U[r:=V], then $\tau(r)$=U; i.e., unprotected contexts access only unprotected data.

A state $(\sigma, \tau, T, e)$ obeys the dynamic-separation discipline if, whenever $(\sigma,\tau,T,e)\mapsto_s^* S'$, the state S' is locally good. In the special case where $\sigma$, $\tau$, and T are empty, then e obeys the dynamic-separation discipline if $(\emptyset,\emptyset,\emptyset, e)$ does.

Dynamic separation is based on the strong semantics and also provides a correctness criterion for implementations of this strong semantics. Given an expression e that obeys the discipline, an implementation should conform to the strong semantics in the execution of e. The implementation may however rely on different techniques, and may well produce different results for expressions that do not obey dynamic separation.

In an implementation in which two separate heaps hold protected and unprotected data, protect and unprotect operations marshal data between the heaps. In this implementation, even though protect and unprotect only update the protection state in the strong semantics, their realizations may perform other nontrivial work.

C# contains constructs that are not present in the AME calculus. In an implementation, C# constructs that involve protection-mode checks are considered where shareable dynamically-allocated mutable data is associated with a protection mode and that access to the data must be consistent with its protection mode. The protection mode of static fields may be declared since they are not dynamically allocated. A protection mode with each C# object may be dynamically associated. In particular, a protection mode may be stored in an object's header, re-using space already reserved there by many STMs.

C# also provides operations not present in the AME calculus, as follows.

Method calls. An object's methods are immutable, as such, there might not be restrictions on method calls. Protected code may call a method on an unprotected object and vice versa.

Array lengths, runtime type information. As with method definitions, these are immutable data maintained by the runtime system. For consistency with method calls access checks might not be performed.

Delegates. A delegate encapsulates a reference to a particular static method or an instance method on an object. A delegate itself is a C# object with fields that represent the target. Delegates may be treated as C# objects, initializing their protection mode in the usual way and subsequently checking it as a consequence of the field accesses.

Boxed values. C# provides mechanisms for "boxing" a value (i.e., an instance of a struct) to create a heap object that can be referred to by an ordinary object reference. These may be treated as ordinary objects.

Indirect data accesses. C# allows the creation of references to individual fields, array elements, and the like. Creating a reference does not access mutable data, so references may be created and passed freely. However, in an implementation, the target's protection mode (if any) should be correct when attempting an access.

Access from native code. C# provides for calls into native code by a mechanism called p/Invoke: a method signature is given, but the code is imported from a native library. Rules define defaults for marshaling data across the call, and a MarshalAs attribute is provided to override these defaults (e.g., to marshal a string in UNICODE format rather than ASCII). There are cases to consider: (i) data accessed during marshaling and (ii) data accessed from native code. Regarding (i), native calls may occur only in unprotected code, so the marshaling code is treated as any other (i.e., the data being marshaled must be unprotected). Regarding (ii), accesses from native code may be interpreted to be the same as other unprotected accesses, i.e., a program that obeys the discipline should not touch a protected object from native code. Also, independently of the native code itself, a requirement may be made that pinned objects are unprotected.

Locks, volatile fields. As with native calls, lock operations and all accesses to volatile fields may not be permitted in transactions.

In addition to the C# features discussed above, an object's Finalize method may be called by the runtime system when the object has become otherwise unreachable. The finalizer may run transactionally or non-transactionally. By choosing a default, if the object becomes unreachable in the "wrong" state, the finalizer cannot access its fields. If the finalizer runs dynamically based on its current protection mode, then an HTM-based implementation would need to track the mode. As such, in an implementation, the finalizers may run non-transactionally for clean-up work with native code.

Each C# class has a static initializer that contains code to initialize its static fields. This may be run in unprotected mode, they may use protected code when touching protected statics.

Figure 2:
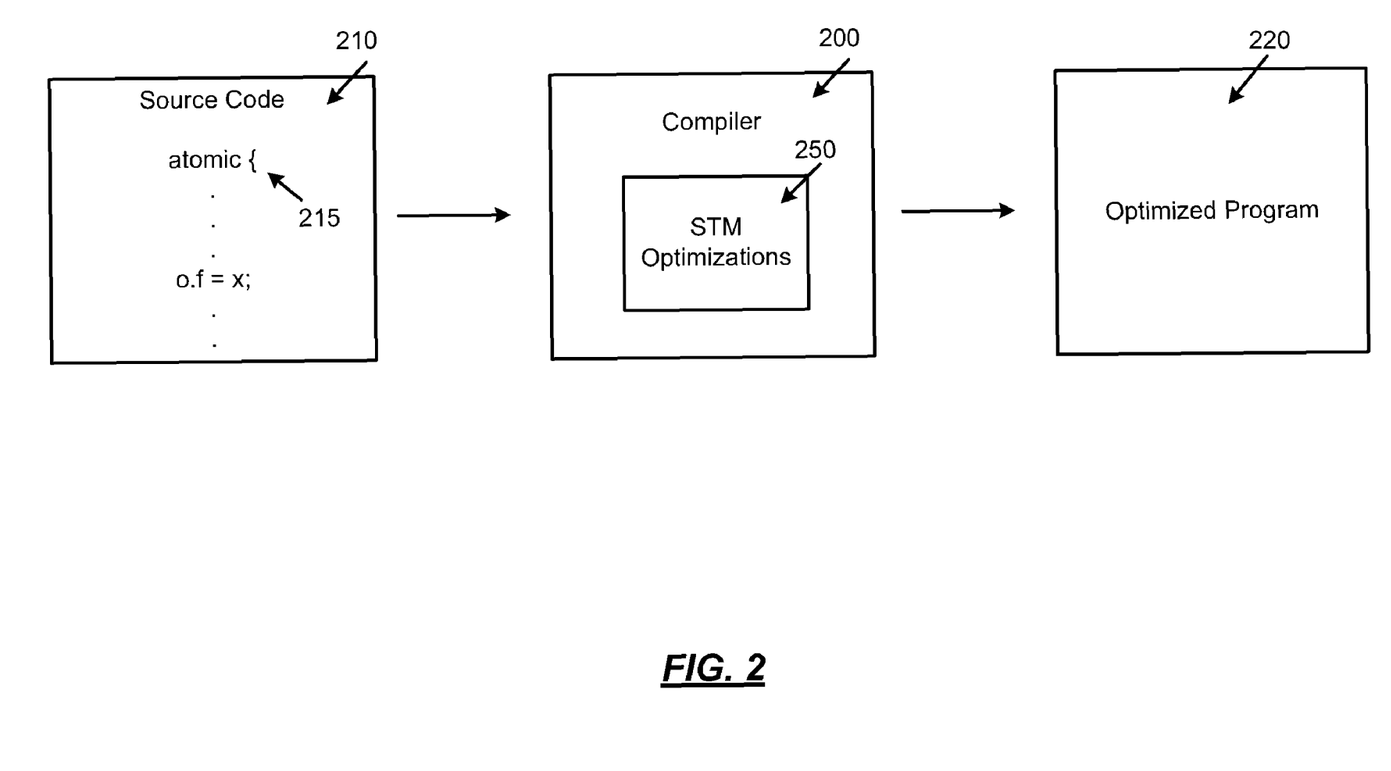
FIG. 2 is a block diagram of a compiler used to compile source code including transactional code.

Implementations of dynamic separation may be as follows. FIG. 2 is a block diagram illustrating one example of a compiler 200, used to create an optimized program 220 utilizing software transactional memory. In the illustrated example, the compiler 200 takes as input source code 210. As illustrated, the source code 210 contains one or more atomic blocks 215. As mentioned above, in one implementation, inclusion of these atomic blocks avoids additional programming for a programmer wishing to utilize STM; these blocks are modified by the compiler to include decomposed STM instructions, which are then optimized. While FIG. 2 illustrates a single piece of source code, it should be recognized that this is merely for simplicity of illustration; the techniques and systems described herein apply as well to multiple source code files that are compiled together, as well as source code that uses already-compiled code. Additionally, in various implementations different code languages are used, including C++, C#, Java, C, and others. In various implementations, interpreted languages may be optimized as well. In the illustrated example, this optimization is provided by STM optimizations 250, which is integrated in the compiler. After compilation and optimization, an optimized program 220 is produced this utilizes software transactional memory. Additional details of runtime operations of such an optimized program are described in greater detail below. Additionally, while the illustrated implementation shows compilation into an executable file before execution, alternative implementations of the techniques described herein may compile and optimize programs immediately before or concurrently with execution.

Although AME constructs have been used to illustrate the exemplary implementations above, similar concepts may be applied to other mechanisms for delimiting transactions, such as atomic blocks.

Figure 3:
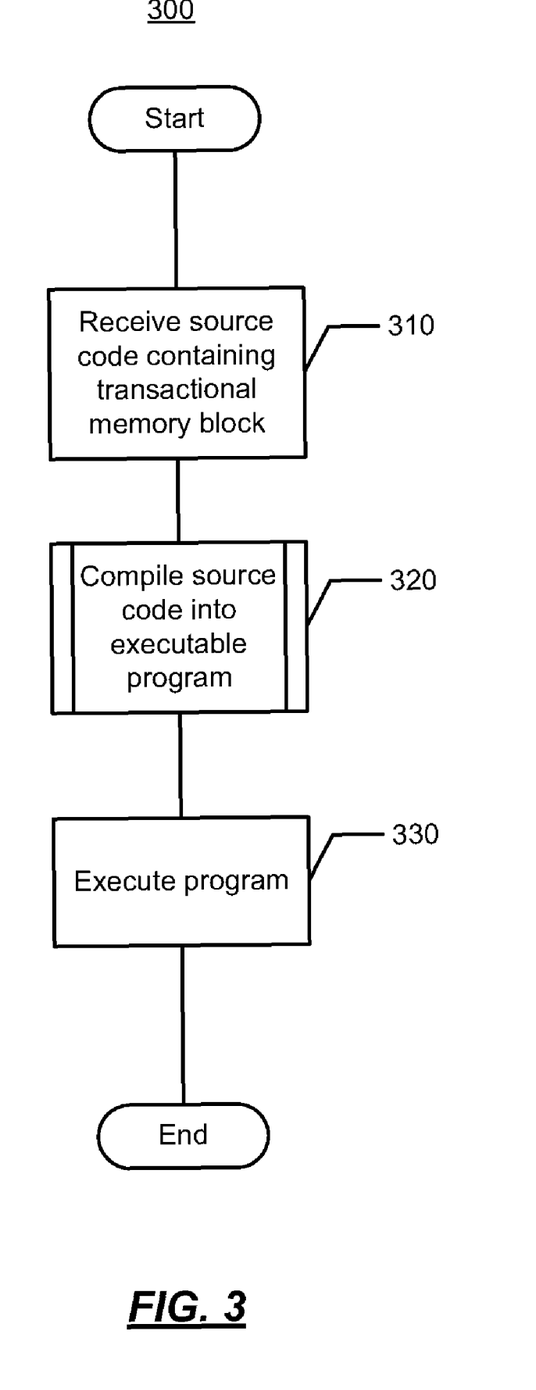
FIG. 3 is a flowchart illustrating an example process of compiling and executing a program using transactional memory.

FIG. 3 is a flowchart of an example process 300 for compiling and executing a program using STM. In various implementations, the illustrated process blocks may be merged, divided into sub-blocks, or omitted. The process starts at block 310, where source code containing transactional memory blocks (such at the atomic blocks of FIG. 2) is received. In an alternative implementation, the source code may not contain transactional memory blocks, but instead may comprise individual software transactional memory instructions, such as the word-based or decomposed instructions described above. Next, at block 320, this source code is compiled into an executable program. Specific examples of compilation are described in greater detail below. At block 330, the executable program is executed.

In an implementation, an optimizing C# compiler (e.g., complier 200) may use in-place updates (i.e., all memory accesses are made directly to the heap) and lazy conflict detection (i.e., conflicts are detected some time after they have happened, rather than prevented from occurring). In this implementation, an STM associates meta-data with each heap object and, within transactions, adds operations to "open" each object before it is accessed (e.g., OpenForRead on objects about to be read, and OpenForUpdate on objects about to be updated). The meta-data, called an object's "STM word", records a version number indicating how many times the object has been opened for update. The version number is logged in OpenForRead and re-checked during transaction validation. A concurrent change indicates a conflict.

The STM word also contains a flag indicating whether the object is currently "owned" by a transaction, i.e., open for update. This flag supports mutual exclusion between writers. Separate operations may be used to log values about to be overwritten, but they are not involved in implementing dynamic separation. The STM word's format may be modified to include a protection flag (or bit) in place of one bit of the STM word's version number. The flag indicates whether or not the object is protected and is initialized according to the current execution mode when an object is allocated. These protection flags may be modified by the implementations of protect/unprotect: the rest of the STM leaves the protection flags unchanged. Alternative implementations may place the protection flag elsewhere; for example as part of a different header word for the object or as part of a structure associated with the object via a look-up mechanism.

The implementation may maintain an invariant that, during execution, transactions update only objects whose protection flags are set. The correctness of the implementation may rely on this invariant, i.e., even if a transaction continues running after a conflict, then it will still access only objects that the program has designated as protected. In this manner, zombie transactions will not update unprotected objects so, if the program is good, these updates will not be seen by non-transacted code.

In an implementation, this invariant is maintained at runtime by modifying the function OpenForUpdate. A DS prefix may be used on functions provided by the implementation with dynamic separation and an STM prefix on the underlying functions provided by the existing STM. Pseudo-code for this is below for a non-debug implementation of DSOpenForUpdate.

```
void DSOpenForUpdate(tm_mgr tx, object obj) {
    STMOpenForUpdate(tx, obj); if (!IsProtected(GetSTMWord(obj))) {
        if (STMIsValid(tx)) {
            // Valid and choosing to access an unprotected object
            throw new DynamicProtectionError( ); // Fail (uncatchable)
        } else {
            // Choice to access object may be based on invalid state
            STMAbort(tx); // Roll-back and re-execute
}}}
```

Figure 4:
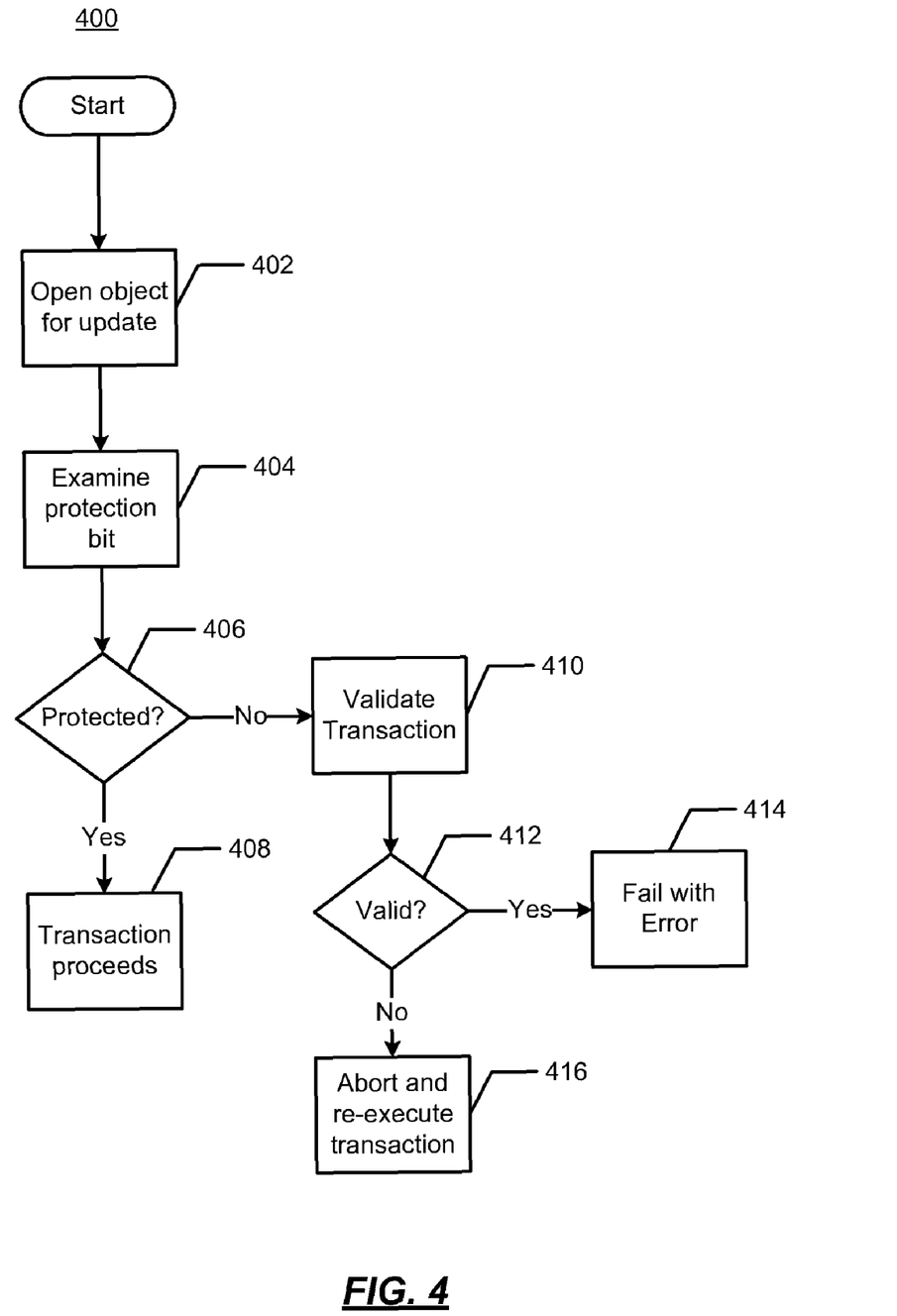
FIG. 4 illustrates an exemplary process performed for checking a protection status.

FIG. 4 illustrates an exemplary process 400 performed before making a transactional update to an object. At 402, the process begins by opening the object for update using the existing mechanism of the transactional memory, leaving the protection bit unchanged. At 404, the protection bit is examined. At 406, it is determined if the object is protected from the protection bit. If the object is protected then, at 408, the transaction proceeds as usual. If the object is unprotected then, at 410, the transaction is validated. At 412, it is determined if the transaction is valid. If it is valid then, at 414, it is determined that the program is not good, i.e., it is about to transactionally access the unprotected object and the program fails with an error. If the transaction is not valid at 412, then, at 416, it may be that the decision to access the object was based on an inconsistent view of the heap and the transaction is aborted and re-executed.

In an implementation, the STM interface is extended with operations that correspond to protect/unprotect. The unprotect is in pseudo-code below for a non-debug implementation of DSUnprotect.

```
void DSUnprotect(tm_mgr tx, object obj) {
    while (true) {
        w = GetSTMWord(obj);
        if (!IsProtected(w) {
            break; // Already unprotected: done
        } else if (IsOwned(w)) {
            continue; // Wait until object not open for update
        } else {
            new_w = CreateSTMWord(w.GetNextVersion( ),
                UNPROTECTED, NOT_OWNED);
            if (CASSTMWord(obj, w, new_w)) {
                break; // Installed new STM word; done
}}}}
```

Figure 5:
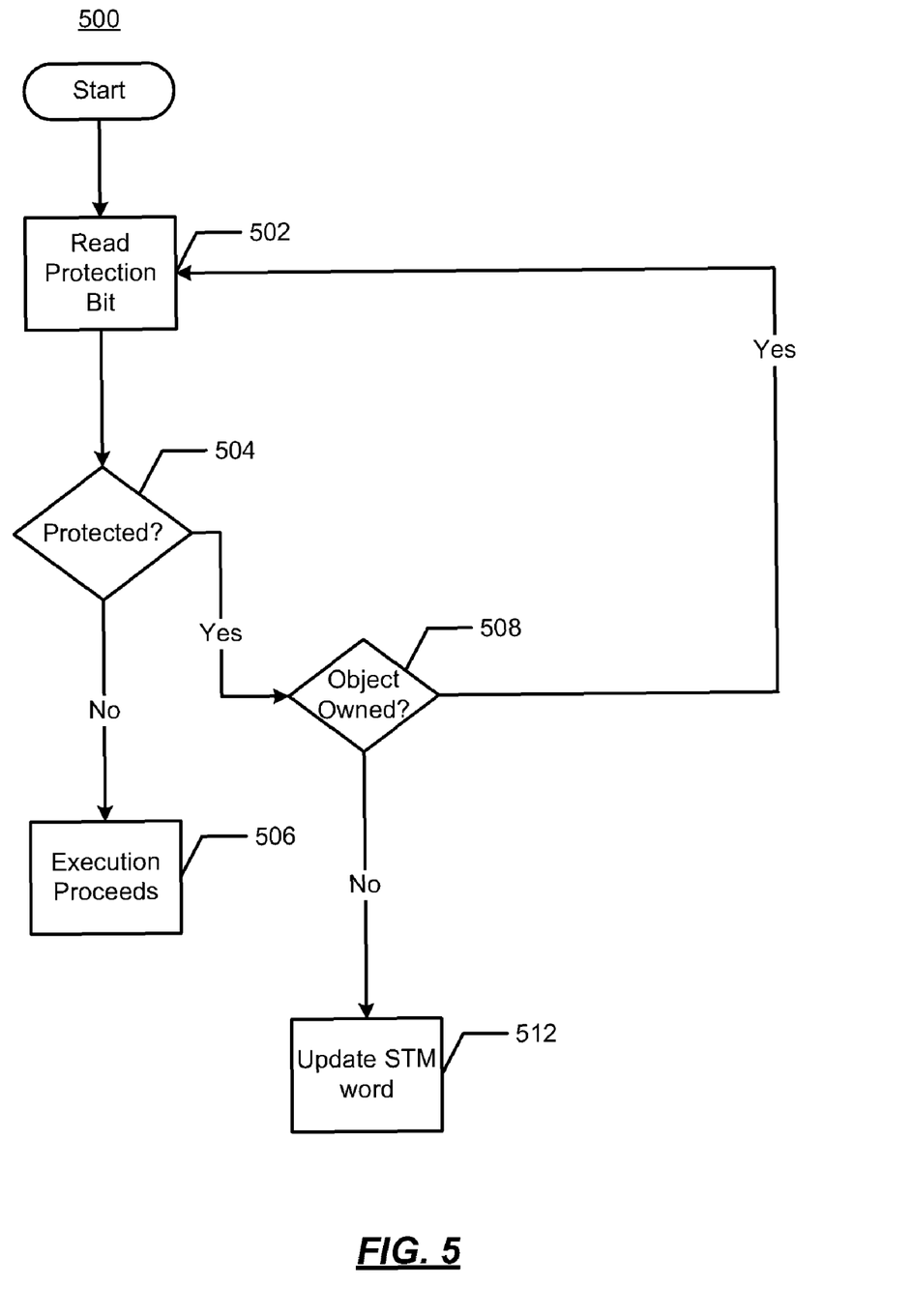
FIG. 5 illustrates an exemplary process for unprotecting an object.

FIG. 5 is an exemplary process 500 for unprotecting an object. At 502, the object's protection bit is examined. At 504, it is determined if the object is protected (e.g., checking the protection bit). If the object is not protected, then at 506, execution proceeds. If, at 504, the object is determined to be protected, then at 508, it is determined if the object is owned by a concurrent transaction. If the object is owned, then the process loops back to 502. The loop through 508 continues until the object is no longer owned or protected. When either condition is met, then at 512, the STM word is updated with a new version number. The STM word may be marked as NOT_OWNED and UNPROTECTED.

The implementation of FIG. 5 is a loop which repeats until either (i) it observes that the object is already unprotected (either before the call, or by a concurrent unprotect), or (ii) it succeeds in updating the object's STM word to mark it as unprotected. The second case waits until the object is not owned by any concurrent transaction (so IsOwned returns false). The waiting is to preserve the implementation invariant that protected code updates only protected objects. Even in a good program, a zombie transaction may have a previously-protected object open for update and therefore be able to continue updating it; the process waits for it to roll back. The updating increments the version number in the STM word as well as setting the protection bit/flag. This may be done with lazy conflict detection to cause any concurrent transaction that has the object open for read to fail its next validation check if it is concurrent with the object becoming unprotected.

An exemplary implementation of protect is symmetric to that of unprotect illustrated in FIG. 5. With regard to the above pseudo-code for unprotect, the negation would be removed on !IsProtected, and the STM word would be created with a PROTECTED flag rather than UNPROTECTED.

In some implementations, a dynamic check of whether a program run is good or not may be made. This implementation may be used for debugging and testing. Tests may be made on data accesses to check whether or not they are made in the correct mode. In making these checks an implementation may prevent memory accesses from being introduced, removed, or re-ordered so that the execution under test corresponds to the program source code. The implementation may distinguish between the following kinds of data: (i) stack-allocated data, (ii) static fields, whose protection mode is given by attributes in the source code, and (iii) objects, whose protection mode is set dynamically, In the first two cases, checks may not be needed on access to the stack as the data is not shared. Checks on statics may be handled during compilation. Since separate versions are generated for protected and unprotected code, correct-mode accesses are complied as normal and incorrect-mode accesses to code that will report an error when executed. Rather than report an error immediately at compile time, this is done to avoid false positives. Object accesses are handled by checking the protection flag bit in the object's STM word when reading or writing to data. Accesses may be from the following kinds of code:

Protected code. Report an error, such as a DynamicProtectionError, if either (i) a valid transaction opens an unprotected object for writing, or (ii) a valid transaction sees an unprotected object in its read set during a successful validation.

Unprotected managed code. Check the object's protection mode atomically with the data access. The following is an illustration of why this check is made atomically:

```
unprotected {                unprotected {
    // Check o is unprotected (C1)    protect(o); // (P1)
    r1 = o.x; // (R1)        }
}                            o.x = 42; // (W1)
                             o.x = 0; // (W2)
```

If C1 runs first and succeeds, then P1 runs and protects the object before a transaction that writes to it with W1 and then W2. Read R1 may execute between W1 and W2, seeing a value that is not possible under the strong semantics. However, because the check C1 is not atomic with read R1, no error is reported.

This atomicity may be handled by compiling each unprotected memory access into a series of steps that accesses the STM word along with the data location. Below shows operations that may be used before and after each access to check data accesses from unprotected code.

```
void DSPreAccessCheck(tm_mgr tx, object obj) {
    while (true) {
        w = GetSTMWord(obj);
        if (IsProtected(w) {
            throw new DynamicProtectionError( ); // Fail (uncatchable)
        } else if (IsOwned(w)) {
            continue; // Wait until no concurrent unprotected access
        } else {
            // Mark the object as locked
            new_w = CreateSTMWord(w.GetVersion( ), UNPROTECTED,
            OWNED);
            if (CASSTMWord(obj, w, new_w)) {
                break; // Installed new STM word; done
}}}}
void DSPostAccessCheck(tm_mgr tx, object obj) {
    while (true) {
        w = GetSTMWord(obj);
        new_w = STMWord(w.GetVersion( ), UNPROTECTED,
        NOT_OWNED);
        if (CASSTMWord(obj, w, new_w)) {
            break; // Installed new STM word; done
}}}
```

Figure 6:
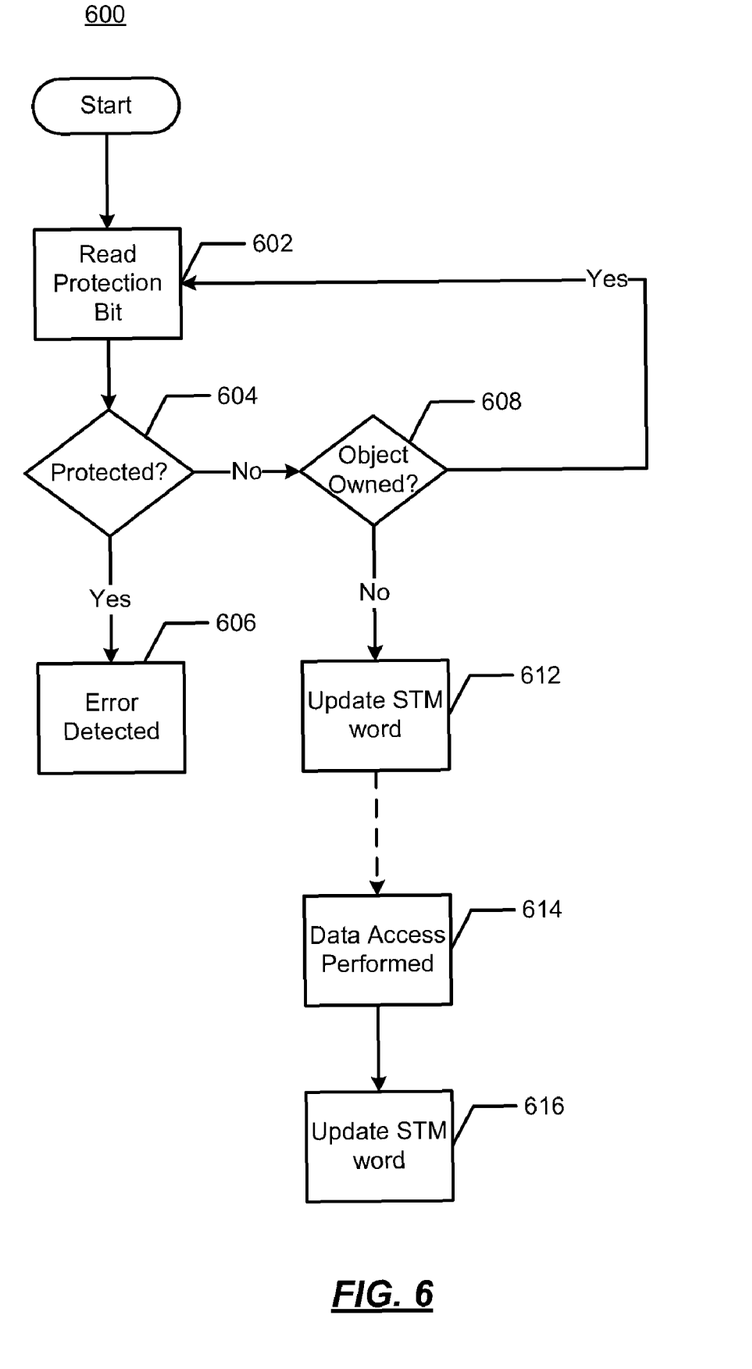
FIG. 6 illustrates a process for checking access from unprotected code.

FIG. 6 illustrates a process 600 for checking access from unprotected code. At 602, the pre-access check begins by checking the protection bit. At 604, it is determined if the object is protected (e.g., checking the protection bit). If the object is protected, then at 606, a dynamic protection error is detected. If, at 604, the object is determined not to be protected, then at 608, it is determined if the object is owned by a concurrent transaction. If the object is owned, then the process loops back to 602. The loop through 608 continues until the object is no longer owned or unprotected. When either condition is met, then at 612, the STM word is updated. The STM word marked as OWNED and UNPROTECTED may be used as a lock-value to identify objects temporarily being accessed by unprotected code. At 614, the data access is performed. At 616, the STM word is updated. The object is indicated to be UNPROTECTED and NOT_OWNED.

Performance improvements may apply to implementations, such as eliding checks on locations that are known not to be accessed by the implementation of protected code, handling read accesses by reading the STM word before and after the access and checking that the values are the same and unprotected, and coarsening DSPreAccessCheck . . . DSPostAccessCheck pairs across accesses to the same object.

Some implementations include runtime system (RTS) code, the STM, garbage collector (GC), and other pieces of the RTS that are implemented in C# and compiled along with the application. The RTS accesses disjoint data from the application (e.g., an object's header rather than its payload fields), except for times when it accesses entire objects as data (e.g., during garbage collection with all threads stopped). The RTS performs its own internal concurrency control (whether called from protected code or unprotected code). The STM is integrated with the GC and aware of object relocation and reclamation.

Errors from accesses made by RTS code may not be reported, therefore an attribute RTSRoot may be used to identify entry points to the RTS. Such methods are compiled without access-mode checks along, recursively, with any code they call. Methods may be compiled three times: once for protected use, once for unprotected use, and once for RTS use. Typically, the RTS does not call into application code and only a small number of core classes are used by both the RTS and applications (e.g., System.UIntPtr whose instances represent pointer-sized integers).

With regard to native code, it may not be instrumented to detect whether it attempts to access protected objects; these accesses may be made by the kernel, or by DMA transfers from devices. Instead, implementations may rely on the fact that managed objects have been pinned in unprotected code before being passed to native code. From this, it may be tested that (i) an object is unprotected when it is pinned, (ii) an object being protected is not pinned.

In some implementations, synchronization constructs like transactions and dynamic separation may be used over many such models and may abstract the low-level details of particular models. In some programming language implementations, memory operations within a thread can be re-ordered, added or removed by program transformations. A "memory model" defines which such transformations are correct for a given programming language. The .NET 2.0 Memory Model (.NET Framework is available from MICROSOFT CORP.) defines a list of properties that an implementation of the .NET 2.0 Framework satisfies:

The behavior of a thread when run in isolation is not changed.

Volatile memory accesses cannot be added, deleted, or moved.

Reads cannot move before entering a lock.
Writes cannot move after exiting a lock.
Reads and writes cannot move before a volatile read.
Reads and writes cannot move after a volatile write.
Reads and writes cannot be added.

A read can only be removed if it is adjacent to another read to the same location by the same thread (perhaps after using other rules to move reads).

Writes cannot move past other writes from the same thread.
Reads can only move earlier in time.

If the input program is correctly synchronized under dynamic separation and volatile memory accesses, lock operations, and protect/unprotect calls occur only in unprotected code then, under strong semantics, (i) protected code accesses only protected data (and likewise for unprotected code and data), and (ii) protected code performs operations only through the TM implementation. This separation means that the correctness of the TM implementation can be reasoned about separately from the remainder of the system.

In some implementations, a memory model such as the .NET 2.0 Memory Model may be extended to define how protect/unprotect may be re-ordered with other operations. For example, if they may be re-ordered freely within the unprotected fragment in which they occur. There may be cases where this is too permissive because it allows a correctly synchronized program to be transformed into one that is incorrectly synchronized. For example, consider:

```
unprotected {
    unprotect(o1); // U1
    r1 = o1.x; // R1
}
```

If R1 could be moved before U1 then R1 may attempt to read from a protected object. The same problem occurs for a write and, in the case of protect, with reads and writes before the protect call. Thus, a rule may be defined as follows: reads and writes cannot move before an unprotect, or after a protect, on the same location.

A similar problem may occur with an unprotect operation in one thread followed by a read or write in another thread. For example, double-check locking is correct in unprotected C# code and allows an object constructed by one thread (perhaps calling unprotect in its constructor) to be read by another (perhaps making assumptions about the protection of data associated with the object) without any explicit synchronization via locks or volatile fields. This observation suggests a rule that may be defined as: writes cannot move before a protect or unprotect.

These two examples indicate that many re-orderings of reads, writes, protect/unprotect may be prohibited. Therefore, for simplicity an additional property for .NET Memory Model may be: reads and writes cannot move past protect/unprotect. This may be enforced by having the compiler treat protect/unprotect as having unknown side effects.

The .NET Memory Model properties prohibit transformations that are valid in other languages. For instance, the Java memory model would allow each thread's reads and writes to be reordered in the following fragment:

```
unprotected {        unprotected {
  y=1;                 x=2;
  r1=x;                r1=y;
}                    }
```

This transformation is not valid in .NET 2.0 because "reads can only move earlier in time." The decision of whether or not to permit such a transformation is orthogonal to the design of dynamic separation; this transformation does not permit read and writes that are valid under the strong semantics to be moved to a place where they are invalid in the implementation. Additionally, they may not move past changes to protection mode.

This is not true for models without the property "reads and writes cannot be introduced." From a performance viewpoint, this would allow a loop-invariant read to be hoisted by a compiler, or to avoid frequent memory fences in an implementation that targets a processor that allows re-ordering across data-and control-dependencies.

Re-ordering across dependencies may cause the implementation to access locations that it would not touch under the strong semantics. Below is a "racy publication" idiom derived from FIG. 1 by hoisting A2's read of x. If an implementation does this then, without care, it may read x before U1, read x_shared after A1, and successfully commit A2.

```
// Initially: x_shared=false, x=0
// x_shared protected, x unprotected
//U1                      //A2
unprotected {             r1 = -1; r2 = x;
  x = 42;                 if (x_shared) {
  protect(&x);              r1 = r2;
}                         }
// A1
x_shared = true;
```

Some memory models allow additional memory accesses to be introduced. Such additions within a transaction may be problematic if the location accessed is unprotected. It would be incorrect for an implementation to report an error in such a case. However, if the data changes protection mode at least once during the transaction, then the increment to the version number in protect/unprotect may cause re-execution of the transaction. Alternatively, if the data remains unprotected through a transaction, then either (i) the access would have been performed at some other time under the strong semantics (i.e., the program is not good), or (ii) the access is one introduced by the implementation and the value read is not used. In both (i) and (ii) the transaction may commit. In an alternative implementation, the addition of such reads may be prevented by indicating in the compiler that OpenForRead may raise an exception, and preventing calls to it from being added.

In some implementations, the programming models may be supported by different TMs. A distinction between TM implementations may be made based on whether or not they use the same object formats for transacted and non-transacted data. Hardware implementations typically use the same format, as do many software implementations. Other software implementations use different formats, e.g., extra levels of indirection between a transacted object header and payload, or extra space in transacted objects.

Dynamic separation may be implemented over the first kind of TM subject to: (i) the granularity at which the TM performs conflict detection is the same as the granularity at which the language exposes dynamic separation, and (ii) the granularity at which the TM logs updates or undo operations is finer than the granularity at which it performs conflict detection. The first criterion enables the association of protection-mode information with data so that transactions that attempt updates will detect if they are attempting to access unprotected data. The second criterion ensures that the implementation of good programs does not access unprotected data from inside transactions.

Alternative TMs, such as an STM with deferred updates or eager conflict detection may prevent zombie transactions from making updates to the heap. Using a TM with strong atomicity leaves the implementation of DSProtect and DSUnprotect as a memory fence. Dynamic separation may also be implemented, using protect/unprotect to marshal between different representations of the object without duplicating the heap. To preserve type-safety, it may remain valid to perform unprotected accesses to the object's protected representation; e.g., the start of a protected object's representation is the same as the corresponding unprotected object, or an indirection-header can be overlaid on the STM word.

In some implementations, the use of dynamic separation may be confined to system libraries and the remainder of the application operates in protected code. In one such implementation, the software code may lie inside an I/O library, which at its core uses unprotected code and data to access the underlying legacy I/O calls provided by the operating system. This operates as follows.

Running inside a transaction, the call of AsyncStartRead places the request (read Block) onto an internal (global) queue:

```
ioInfo = new Action(readBlock, ...);
if (queue.head == null) {
  queue.head = ioInfo;
} else {
  queue.tail.next = ioInfo;
}
queue.tail = ioInfo;
```

When this transaction commits, the updated contents of the queue are visible to a permanently executing thread (TSend) inside the I/O library, which extracts the request, then uses unprotected code to hand it to the operating system:

```
do {
    blockuntil(queue.head != null);
    ioInfo = queue.head;
    queue.head = queue.head.next;
    buffer = ioInfo.buffer;
    unprotected {
        unprotect(buffer);
        osReq = new OSReq(ioInfo, buffer, ...);
        ... call the operating system ...
    }
}
```

The MICROSOFT WINDOWS "completion port" mechanism may be used to receive notification when the actual I/O finishes. A second thread (TReceive) in the I/O library may use unprotected code to receive this notification, then updates the IsCompleted field of the request (thus allowing the application to complete its call of blockuntil):

```
do {
    unprotected {
        ... wait in the OS for an event completion ...
        ... assign the OS request object to "osReq" ...
        protect(osReq.buffer);
        ioInfo = osReq.ioInfo;
    }
    ioInfo.IsCompleted = true;
}
```

The original readBlock object may be accessed only from within protected code, as is the ioInfo object. The actual data array that will be presented to the underlying operating system is readBlock.buffer. This array was allocated (protected) by the application, and after completion will be read (protected) by the application. But, TSend unprotects it before handing the array to the operating system, and TReceive protects it again before setting ioInfo.IsCompleted.

Thus, implementations allow having an unprotected object (e.g., the data buffer during the actual underlying IO operation) carried within an object that remains protected (the readBlock request descriptor). Similarly, a protected object readBlock is carried within unprotected data to be sent through the completion port.

Figure 7:
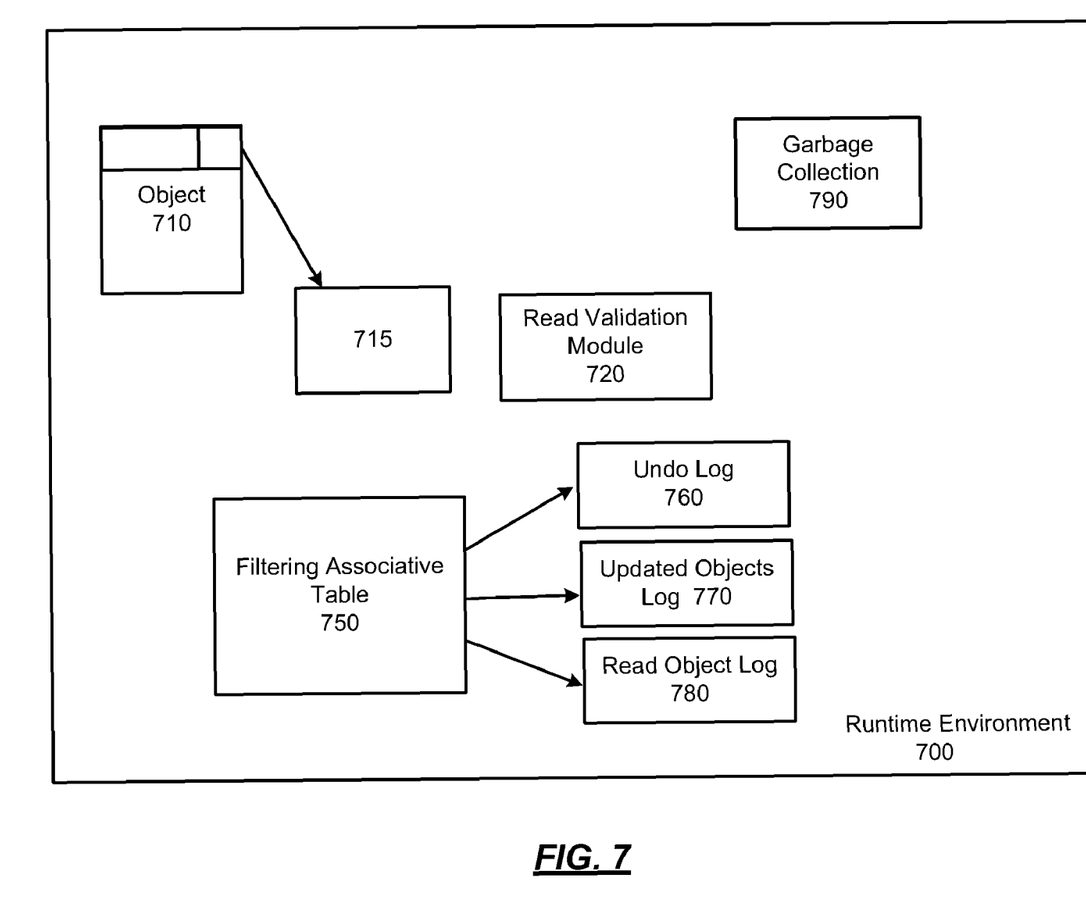
FIG. 7 shows an exemplary a runtime environment.

FIG. 7 is a block diagram illustrating an example of objects and software modules which operate to optimize STM performance during runtime in a runtime environment 700. While FIG. 7 illustrates particular modules separately, it should be recognized that, in various implementations, the modules may be merged or divided in various combinations, or may operate as parts of other runtime software structures which are not illustrated. FIG. 7 illustrates an object 710 operating in the runtime environment, along with a word header 715. The word header 715 may include the protection bit, as described above. FIG. 7 also illustrates a read validation module 720 for implementing the validation procedure, as described above.

FIG. 7 additionally illustrates a filtering associative table 750, which, in some implementations, filters and prevents unnecessary entries from being logged in various combinations of an undo log 760, an updated objects log 770, and a read objects log 780, which make up the transactional memory. FIG. 7 also illustrates a garbage collection module 790 which serves to deallocate objects when they are no longer reachable in the executing program and to compact STM logs during garbage collection.

Figure 8:
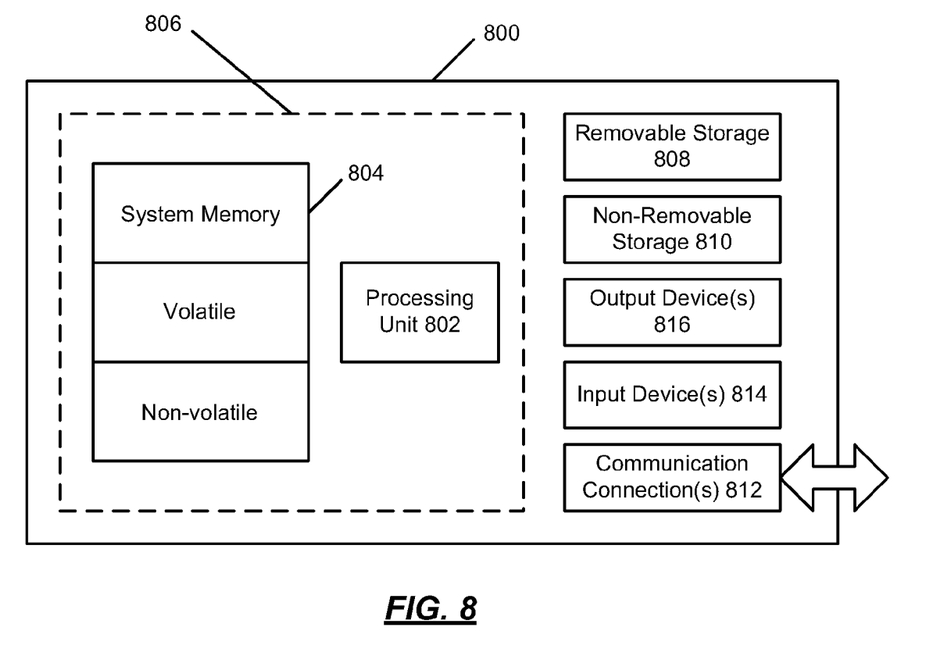
FIG. 8 shows an exemplary computing environment.

FIG. 8 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810. Computing device 800 typically includes a variety of computer readable media. Computer readable media can be any available media that can be accessed by device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communications connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for dynamic separation of transactionally-accessed and non-transactionally accessed data comprising:
    providing protect/unprotect operations to designate data as transactionally-accessed and non-transactionally-accessed;
    providing strong semantics to a program that designates data for a correct access mode prior to access, the correct access mode being transactional access for transactionally accessed data;
    checking that an implementation of transactional code only accesses data designated for transactional access;
    opening an object for transactional update;
    examining a protection status to determine if the object is designated for transactional access; and
    allowing the transaction to proceed if the object is designated as for transactional access, or validating the transaction if the object is not designated for transactional access.

2. The method of claim 1, wherein checking for read access further comprises:
    examining a protection status to determine if the object is designated for transactional access.

3. The method of claim 1, further comprising:
    determining if the object is already protected/unprotected; and
    if not, waiting for the object to not be owned by a concurrent transaction and marking the object as protected/unprotected.

4. The method of claim 3, wherein the protect/unprotect operation further comprises:
    modifying a version number associated with the object so as to indicate a change in status to concurrent transactions.

5. The method of claim 1, further comprising:
    checking if a program is accessing transactional data non-transactionally or non-transactional data transactionally by performing a pre-access check on the object and performing a post-access check on the object.

6. The method of claim 5, further comprising:
    using a transactional memory word as a lock value to identify the object as being accessed by a non-transactional program.

7. The method of claim 5, further comprising:
    marking the object as owned after the pre-access check; and
    marking the object as not owned after the post-access check.

8. The method of claim 1, further comprising:
    dynamically checking if a program is accessing the object in a correct mode.

9. The method of claim 1, wherein the transactional access of transactionally-accessed data is performed in a transactional memory.

10. A computer-readable medium containing instructions which, when executed by a computer, cause the computer to perform a method for dynamic separation in conjunction a transaction, the method comprising:
    providing protect/unprotect operations to designate data as transactionally-accessed and non-transactionally-accessed;
    providing strong semantics to a program that designates data for a correct access mode prior to access, the correct access mode being transactional access for transactionally accessed data;
    checking that an implementation of transactional code only accesses data designated for transactional access;
    opening an object for transactional update;
    examining a protection status to determine if the object is designated for transactional access; and
    allowing the transaction to proceed if the object is designated as for transactional access, or validating the transaction if the object is not designated for transactional access.

11. The computer-readable medium of claim 10, further comprising instructions for:
    determining if the object is already protected/unprotected; and
    if not, waiting for the object to not be owned by a concurrent transaction and marking the object as protected/unprotected.

12. The computer-readable medium of claim 10, further comprising instructions for:
    checking if a program is accessing transactional data non-transactionally or non-transactional data transactionally by performing a pre-access check on the object and performing a post-access check on the object.

* * * * *